United States Patent [19]

Enomoto

[11] Patent Number: 4,555,166
[45] Date of Patent: Nov. 26, 1985

[54] ELECTRIC REMOTE CONTROL MIRROR WITH HALF-BALL PORTION

[75] Inventor: Masao Enomoto, Isehara, Japan

[73] Assignee: Ichikoh Industries Limited, Tokyo, Japan

[21] Appl. No.: 373,783

[22] Filed: Apr. 30, 1982

[30] Foreign Application Priority Data

Feb. 8, 1982 [JP] Japan .................................. 57-17604

[51] Int. Cl.[4] .......................... G02B 5/08; G02B 5/12; A47G 1/24
[52] U.S. Cl. ..................................... 350/634; 248/479
[58] Field of Search ............. 350/289; 74/501 M, 625; 248/900, 479, 481, 483; 403/90, 124, 125, 140

[56] References Cited

U.S. PATENT DOCUMENTS

| 3,609,014 | 9/1971 | Kurz | 350/289 |
| 4,076,392 | 2/1978 | Suzuki et al. | 350/289 |
| 4,202,603 | 5/1980 | Miyauchi | 350/289 |
| 4,324,454 | 4/1982 | Kumai | 350/289 |

FOREIGN PATENT DOCUMENTS 3039343 4/1981 Fed. Rep. of Germany ...... 350/289

Primary Examiner—John K. Corbin
Assistant Examiner—David Lewis
Attorney, Agent, or Firm—Cushman, Darby & Cushman

[57] ABSTRACT

An electric remote control mirror apparatus comprising boss portion mounted on a mirror body fixing the mirror, a concave surface formed at the portion integrally formed with the mirror housing for receiving the mirror body, a pivot connection being composed of the boss portion and the concave surface, a pressure applying member having the surface to be connected to the inner surface of the boss portion and the end portion to be connected to the portion of the mirror housing by passing through the boss portion, a coil spring for pressing the member to the boss portion, thereby to surely support the mirror body within the mirror housing, wherein the rotating resistance of the pivot connection can be easily and precisely adjustable, the rotation of the mirror body around the pivot axis is prevented thereby to avoid vibration and change of inclination of the mirror body.

8 Claims, 24 Drawing Figures

ELECTRIC REMOTE CONTROL MIRROR WITH HALF-BALL PORTION

BACKGROUND OF THE INVENTION (a) Field of the Invention

The present invention relates to an electric remote control mirror apparatus for motor vehicles.

(b) Description of the Prior Art

Conventional electric remote control mirror apparatuses are widely used as an outside mirror, one of such the mirror apparatuses is disclosed in detail in the specification of U.S. Pat. No. 3,609,014.

Referring to FIGS. 1 to 4 a conventional electric remote control mirror apparatus is shown. FIG. 1 is a longitudinal cross sectional view, FIG. 2 a cross sectional view as seen in the direction of the arrow II—II in FIG. 1, FIG. 3 a cross sectional view as seen in the direction of the arrow III—III in FIG. 1, FIG. 4 a cross sectional view as seen in the direction of the arrow IV—IV in FIG. 1.

As seen from FIGS. 1 to 3, a mirror body 2 fixing a mirror 1 is pivotably supported through a pivot connection 4 with respect to a mirror housing 3. The line X—X' passing the center of the pivot connection 4 perpendicularly crosses the line Y—Y' passing the center. Boss portion 6 for a ball joint 5 is integrally formed on the mirror body 2 on each of the above two lines. The boss portion 6 is rearwardly extended to hold the ball joint 5 as shown in FIG. 1. The threaded rod 8 having a ball 7 for the ball joint 5 has a male screw on the peripheral surface thereof, and the threaded rod 8 can be screwed into a female screw provided on a gear 9, the gear 9 being rotatably mounted in a screw member 10. Upon actuation of motors 11 the screw members 10 are rotated to move the threaded rod 8 forwardly or backwardly thereby to incline the mirror body 2. Thus, by the movement of the threaded rod 8 connected to the ball joint 5 on the line X—X' of FIG. 3, the mirror body 2 is rotatably moved around the line Y—Y', and similarly the mirror body 2 is rotatably moved around the line X—X' by the movement of the threaded rod 8 connected to the ball joint 5 on the line X—X' of FIG. 3.

Therefore since the threaded rod 8 is moved forwardly or backwardly by the rotation of the screw member 10, it is inevitably necessary to stop the rotating motion of the threaded rod 8 per se. To this end the ball 7 of the ball joint 5 is held by a hair pin like spring 12 to avoid the rotating motion of the ball 7 i.e. the threaded rod 8. FIG. 4 is a cross sectional view as seen in the direction of the arrow IV—IV of FIG. 1, and the holding states of the spring 12 and the ball 7 are shown, wherein numeral 7a designates a slot formed on the ball 7.

According to the conventional electric remote control mirror apparatus mentioned above, the mirror body 2 to which the mirror 1 is fixed can be rotatably moved around the lines X—X' and Y—Y' respectively by respective and independent actuation of the two motors 11 and 11, thereby to remotely control the angle of the mirror 1. Therefore the apparatus is preferable as an outside mirror i.e. a rear view mirror for motor vehicles.

However, as is apparent from FIG. 1, since the pivot connection 4 is composed of a driving case 3a secured on the fixed mirror housing 3, having the projected ball, and a boss portion provided on the movable mirror body 2 for holding the projected ball provided on the driving-section case 3a, the dimension in the direction of pivot axis 13 becomes inevitably large, resulting in a heavy thickness of the mirror apparatus per se in the direction of the pivot axis 13. Further since the pivot connection 4 is constructed such that the rotating resistance of the pivot connection 4 is provided by the pressing force due to an adjusting screw 14, effected between the ball and the boss portion of the mirror body 2, the rotating resistance can be directly controlled by the adjusting screw 14. Therefore, it is actually difficult to delicately adjust the rotating resistance and further even after a correct adjustment thereof has been established a deviation of the adjustment due to looseness, wear and deformation of the screw 14 can undesirably occurred. In order to overcome the above-mentioned disadvantages, if a spring (not shown) is provided to obtain a stable rotating resistance by the spring force due to the spring, the dimension of the pivot connection in the direction of the pivot axis 13 is further undesirably increased.

As is apparent from the arrangement mentioned above, the rotation of the mirror body 2 around the pivot axis 13 is not restricted, resulting in unstable support for the mirror such that the mirror is not smoothly moved when operating the mirror and the inclination of the mirror undesirably changes when not operating the mirror. Furthermore, according to the arrangement of the hair pin-like spring 12 holding the slot 7a provided on the ball 7, the rotation of the threaded rod 8 per se is insufficiently stopped, especially when the threaded rod 8 is moved forwardly in the the right hand direction in FIG. 1 where the rotation of the threaded rod 8 is not sufficiently stopped. The results in unstable support of the mirror body 2 and allows change in the mirror's inclination.

SUMMARY OF THE INVENTION

The object of the present invention is to overcome the disadvantages of the above-mentioned conventional electric remote control mirror, and to provide an electric remote control mirror apparatus in which the dimension of the apparatus in thickness is reduced, a rotating resistance of a pivot connection being easily and precisely adjustable, a correctly adjusted state of the rotating resistance being maintained without any change in use, and a mirror body being supported stably thereby to especially cause no rotation of the mirror body around a pivot axis and no change of an adjusted inclination of the mirror body.

To achieve the above-mentioned object, the conventional electric remote control mirror is improved by the present invention. The features of the present invention resided in an electric remote control mirror apparatus mainly including a pivot connection for supporting a mirror body and a mirror inclining means for adjusting mirror's inclination. First, the pivot connection is composed of a ball base having a concave surface integrally formed with the member fixed to the mirror housing as a fixed body, and a cylindrical hole provided at the central portion of the concave surface coaxially with the pivot axis, together with elongated projections formed along the inner wall of the cylindrical hole which extend in the direction of the pivot axis. A boss portion is integrally formed with the mirror body as a movable body, for fitting to the concave surface of the ball base. The pivot connection also includes a pressure applying member having a half-ball like portion adapted to be fitted to the inner surface of the boss portion of the mirror body, a cylindrical portion to be inserted into the cylindrical hole, and slots to be connected to the elongated projections. A coil spring is received in the cylindrical portion of the pressure applying member for urging the pressure applying member against the ball base. The mirror inclining means further included a threaded rod having screw at the peripheral surface thereof and an elongated slot extending in the direction of the rod's axis for guiding the threaded rod along the rod's axis, and support means provided with a projection to be connected to the elongated slot, for supporting the threaded rod and guiding the rod along the rod's axis thereby to avoid the rotation of the threaded rod around the rod's axis.

The above and other objects, features and advantages of the present invention will be more clear from the following descriptions with reference to the accompanying drawings.

BRIEF DESCRIPTION OF THE DRAWINGS

FIG. 1 is a longitudinal cross sectional view, FIG. 2 a cross sectional view taken along the line II—II in FIG. 1, FIG. 3 a cross sectional view taken along the line II—III in FIG. 1, and FIG. 4 a cross sectional view taken along the line IV—IV in FIG. 1.

DETAILED DESCRIPTION OF THE PREFERRED EMBODIMENT

Figure 1:
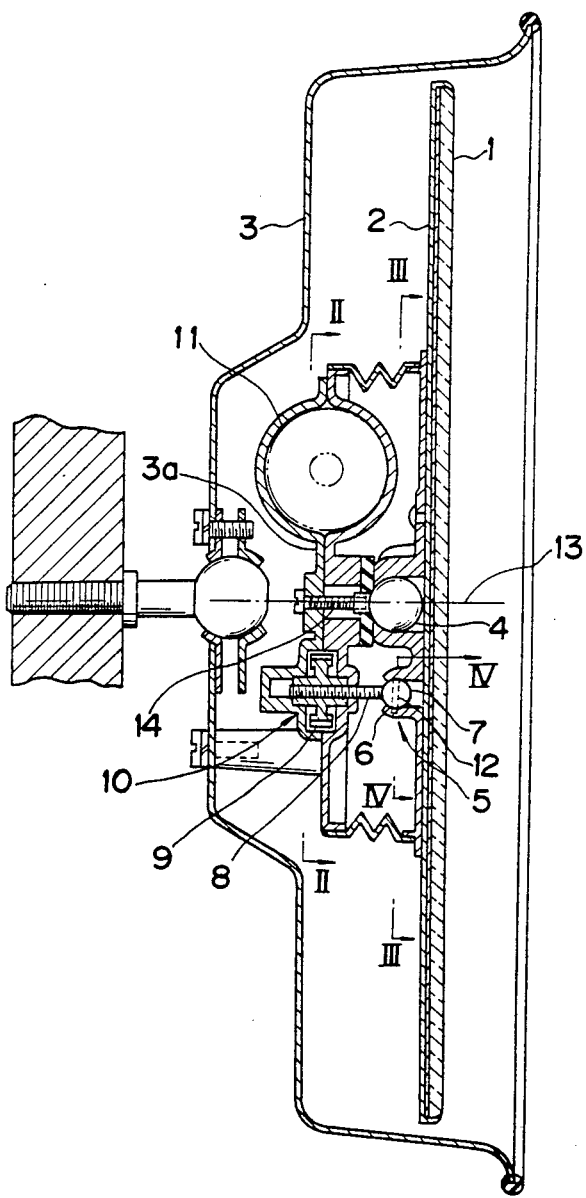
FIGS. 1 to 4 shows a conventional electric remote control mirror apparatus.
Figure 2:
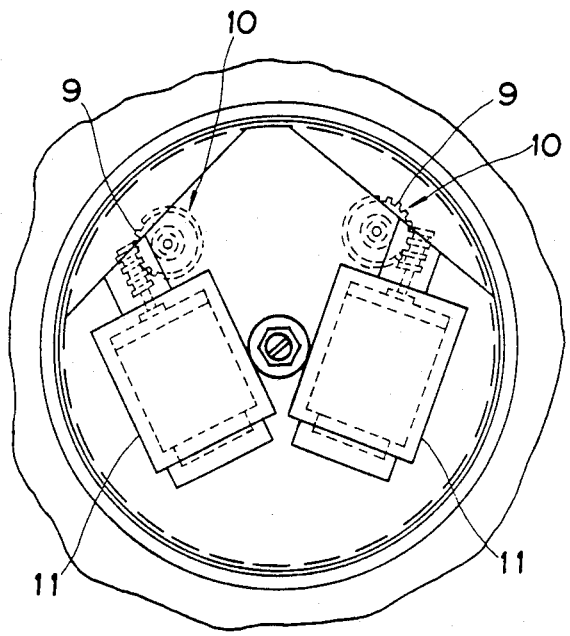
Figure 3:
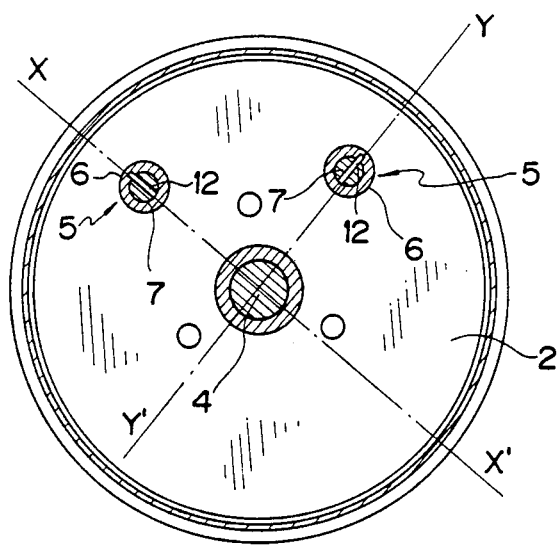
Figure 4:
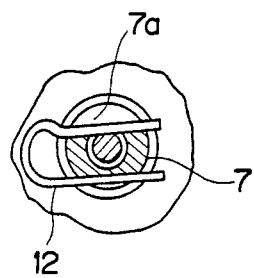
Figure 5:
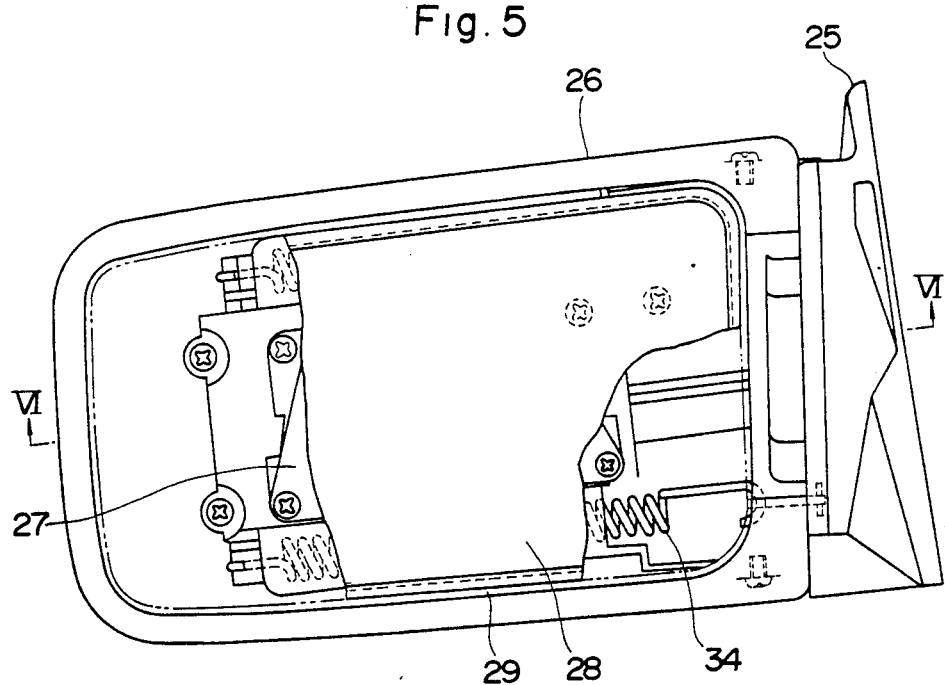
FIG. 5 is a partially exploded elevational view of an embodiment of the present invention.
Figure 6:
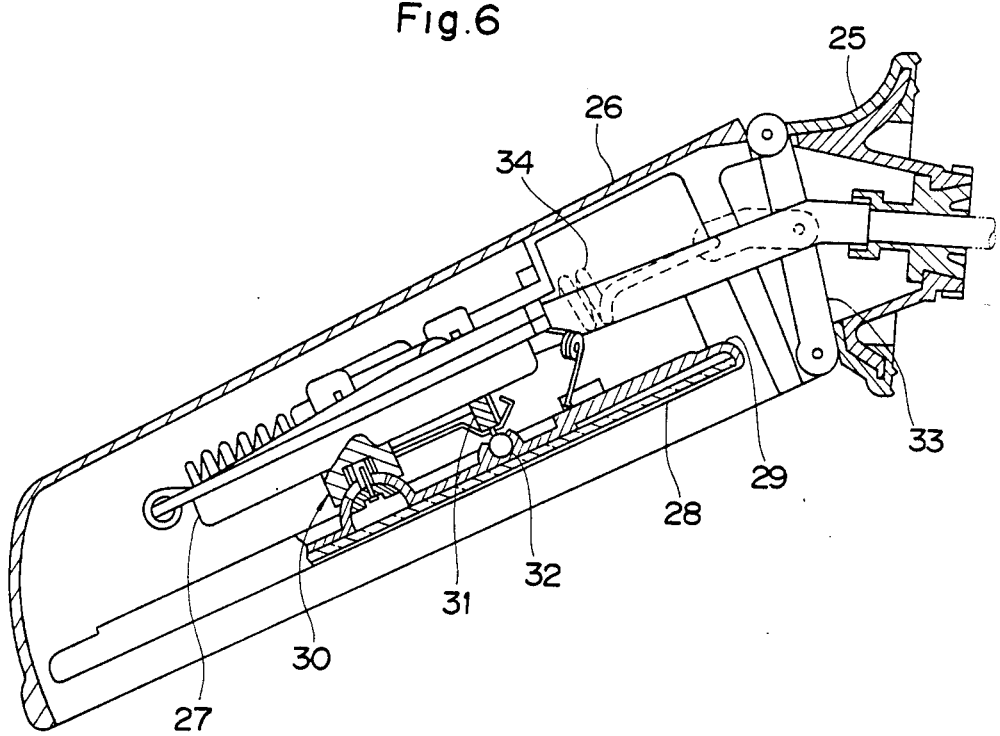
FIG. 6 is a cross sectional view as seen in the direction of the arrow VI—VI in FIG. 5.

Referring now to FIGS. 5 to 20, numeral 25 designates a base fixed on the body of a motor vehicle, 26 a mirror housing, and 27 a driving-section case fixed on the mirror housing 26, 28 a mirror, 29 a mirror body, 30 a pivot joint, 31 a threaded rod movable forwardly or backwardly, and 32 a joint formed at the end of the rod 31 for connecting the mirror body 29 to the threaded rod 31.

In this embodiment the mirror housing 26 is formed separately with the base 25, and is hinged to the base by a hinge 33 and actuated against the base 25 by means of a spring 34. This is a shock absorbing mechanism for absorbing shock occurred upon collision of an external object against the mirror housing 26. The mirror housing 26 is normally fixed on the body of the motor vehicle with respect to the remote control operation of the mirror when no shock is applied to the mirror housing 26.

Referring to FIGS. 7 to 12, numeral 35 designates a ball base integrally formed with the driving-section case 27 fixed on the mirror housing 26 as a fixed member. The ball base 35 is composed of a concave surface 36 symmetrical with respect to a pivot axis 100 in FIG. 10, a cylindrical hole 37 coaxial with the pivot axis 100 provided at the bottom portion of the concave surface 36, and a pair of elongated projections 38 provided on the inner surface of the hole 37 and extended in parallel with the pivot axis 100.

The mirror body 29 has a boss portion 39 rearwardly extended, and the outer surface of the boss portion has the same curvature as that of the concave surface 36 to allow a pivotal movement of the mirror body 29.

A pressure applying member 42 is composed of a half-ball portion 40 the outer surface of which has the same curvature as that of the inner surface of the boss portion 39, and a cylindrical portion 41 having an outer diameter approximately equal to the diameter of the hole 37. The cylindrical portion 41 has a pair of slots 41b, 41b (FIG. 12) adapted to receive the elongated projections 38.

Numeral 43 designates a coil spring adapted to be fitted to the cylindrical portion 41. The one end of the coil spring 43 is contacted to the bottom of the cylindrical portion 41.

Figure 10:
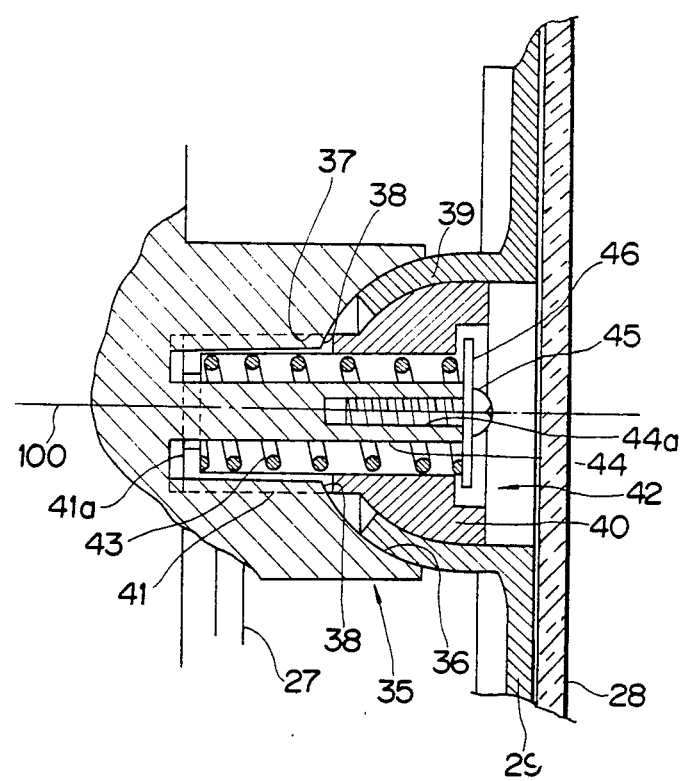
FIG. 10 is an enlarged cross sectional view of a pivot connection shown in FIG. 6.
Figure 11:
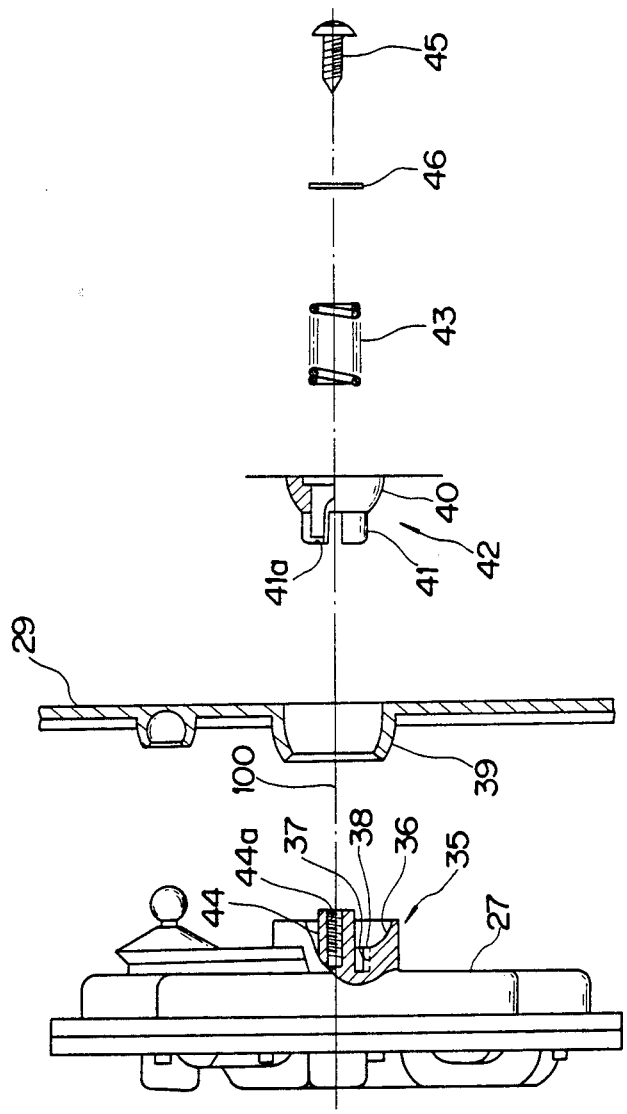
FIG. 11 is an exploded view of the pivot connection.
Figure 12:
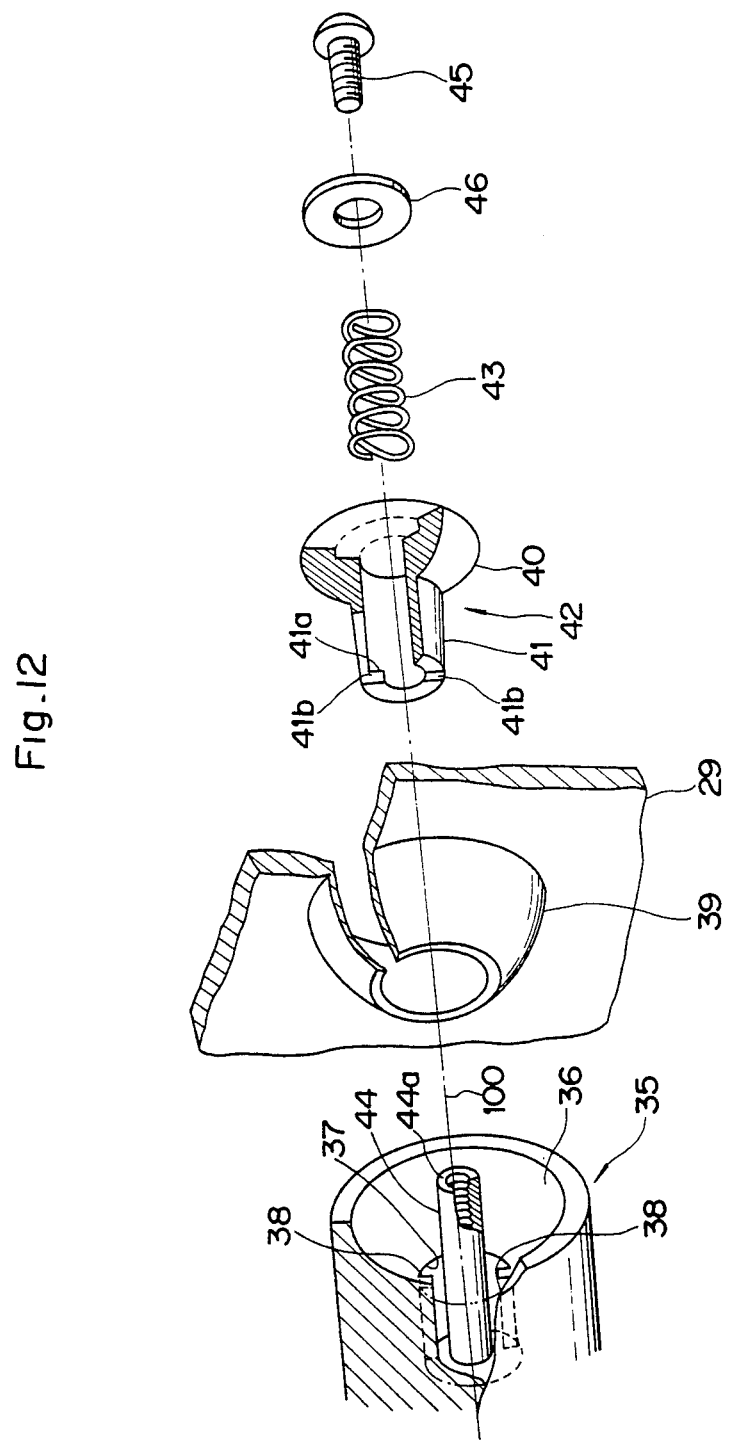
FIG. 12 is a perspective view of the pivot connection shown in FIG. 11.

Referring now to FIG. 10, the boss portion 39 of the mirror body 29 is fitted between the concave surface 36 of the ball base 35 and the pressure applying member 42. The cylindrical portion 41 of the pressure applying member 42 is inserted into the hole 37 of the ball base 35, and the pressure applying member 42 is inhibited to rotate around the pivot axis 100 by the connection of the elongated projection 38 and the slot 41b.

The pressure applying member 42 is urged to the ball base 35 by the spring force of the coil spring 43. To do so, the coil spring 43 is inserted into the cylindrical portion 41 such that the end of the coil spring 43 is contacted to the bottom 41a. There is provided a column 44 at the bottom of the cylindrical hole 37 extending along the pivot axis 100, and a screwed hole 44a at the upper end of the column 44. A screw 45 is screwed into the screwed hole 44a through a washer 46 to press the half-ball portion 40 against the boss portion 39.

According to the arrangement thus constructed, the boss portion 39 are urged with a predetermined and constant force to the ball base 35 by the spring force due to the coil spring 43, with regardless to a fastening torque of the screw 45. Thus the boss portion 39 is pressed to the concave surface 36 with stable and constant force, a stable rotating resistance can be obtained.

As apparent from FIG. 10, the position of the right end of the coil spring 43 is restricted in position in order not to make interference with the back surface of the mirror 28, on the other hand the left end of the coil spring 43 may be located at the deep portion of the cylindrical hole 37, therefore a coil spring having a comparatively larger dimension can be usable without increasing the dimension of the pivot connection in the direction of pivot axis 100. The boss portion 39 has a half ball-like configuration, so that the dimension of the pivot connection in the direction of the pivot axis 100 can be remarkably reduced in comparison with the conventional pivot connection usually utilizing a full-ball configuration.

Further the rotating resistance of the mirror body 29 can be freely changeable by selecting a spring constant, free length and compressed length etc. of a spring. The rotating resistance of the pivot connection can be set a predetermined constant value in regardless with skill in assembling, and the rotating resistance in no way deviated in use. By the way, the rotating resistance may be adjustable, if it is desired, by providing a spacer between the column 44 and the washer 46.

The relative rotation around the pivot axis 100 between the pressure applying member 42 and the ball base 35 is inhibited by the connection of the elongated projection 38 and the slot 41b.

Thus the boss portion 39 of the mirror body 29 is pressed with a constant pressing force by the pressure applying member 42 at the position between the pressure applying member 42 and the ball base 35, so that the boss portion 39 can be pivotably moved smoothly and stably.

Figure 13:
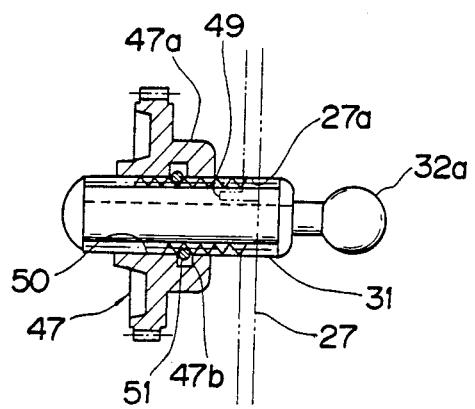
FIG. 13 is an enlarged cross sectional view of a threaded rod shown in FIGS. 6 and 9.
Figure 14:
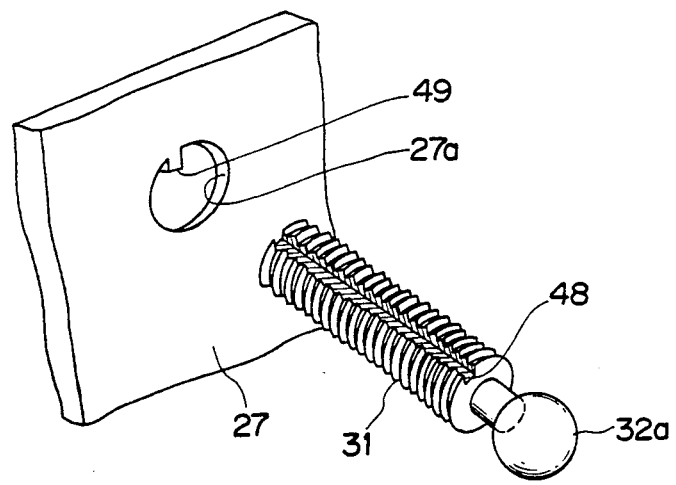
FIG. 14 is an enlarged perspective view of the threaded rod and other parts adjacent thereto shown in FIG. 13.

Referring to FIG. 13 a screw formation is made on the peripheral surface of the threaded rod 31 to screw it into a screw member 47 described hereinafter. The driving-section case is served to guide the movement of the threaded rod 31 in the direction of the rod's axis as shown in FIG. 14, numeral 27a designates a through hole through the wall of the driving-section case 27 to insert the rod 31 therethrough. There is provided a projection 49 within the through hole 27a and an elongated slot 48 adapted to fit to the projection 49 on the portion of the peripheral surface of the threaded rod 31, inorder to guide the forward and backward movement of the threaded rod 31 without rotation thereof. Numeral 32a designates a ball fixed on the end of the threaded rod 31.

According to the arrangement thus constructed, the threaded rod is allowed to move forward and backward without rotation in response to the rotation of the screw member 47 with stability and without any vibration of the mirror 28.

Figure 15:
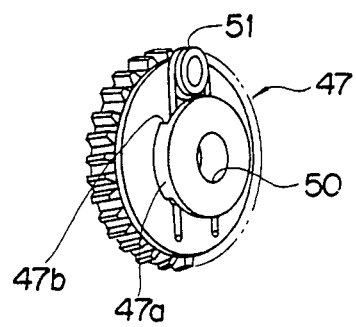
FIG. 15 is an enlarged perspective view of a nut member shown in FIG. 13.
Figure 16A:
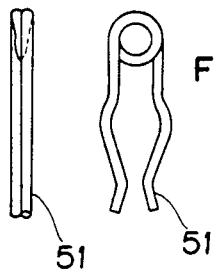
FIG. 16 is front and side views of a spring member shown in FIG. 15.
Figure 16B:
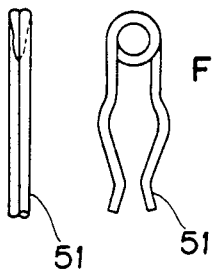
Figure 17:
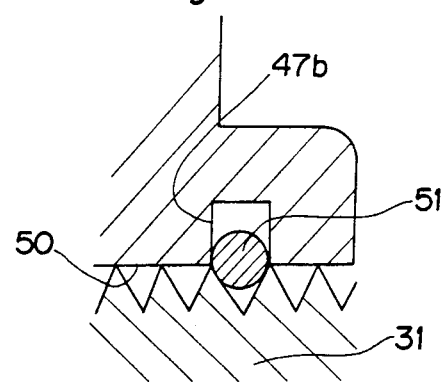
FIG. 17 is an enlarged partial-cross-sectional view showing a connection between the threaded rod and the spring member.

Referring to FIGS. 15 to 17 the screw member 47 does not have a female screw but a through hole 50 at the center portion of the screw member 47 for receiving the screw member 47. Further the screw of threaded rod 3 has a boss-like protrusion 47a having a pair of slots 47b in the surface perpendicular to the axis of the screw member 47. More precisely, one of the paired slots 47b is twisted to the other of the paired slots 47b by the angle corresponding to one pitch of the screw of the threaded rod 31. A slightly twisted spring member 51 as shown in FIGS. 16(A) and (B) is inserted into the slots 47b to pinch the threaded rod 31 as shown in FIG. 17 if which is an enlarged cross sectional view of the rod 31 and slots 47b. According to the above arrangement thus constructed the spring member 51 is only allowed to move along the surface perpendicular to the axis of the screw member 47b, and the spring member 51 pinches the valley of the screw of the threaded rod 31, so that the whole of the screw member 47 is served as function of a nut, and further even if overtorque is occurred for moving the threaded rod 31, it is easily absorbed by resilient deformation of the spring member 51 thereby avoiding any damage of the above mechanism.

Figure 8:
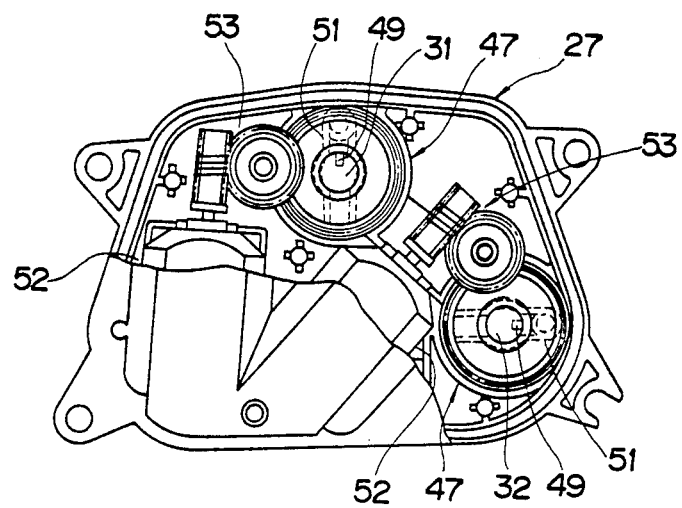
FIG. 8 is a partially exploded sectional view of the driving-section case.
Figure 9:
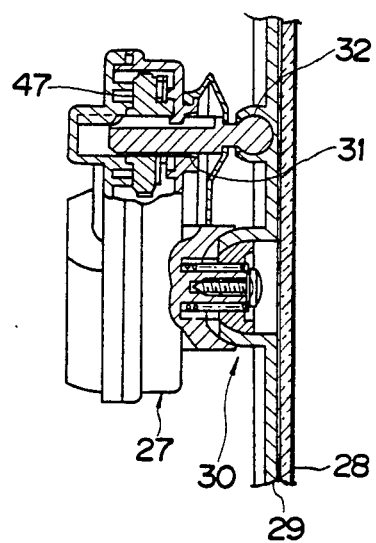
FIG. 9 is a cross sectional view of other parts adjacent to the driving-section case.

As shown in FIGS. 13 and 15 there is provided a gear at the peripheral surface of the screw member 47 in order to make simple the mechanism 53 in FIG. 8, transmission means, for transmitting driving force from the motors 52 and 52 to the screw member 47.

Figure 7:
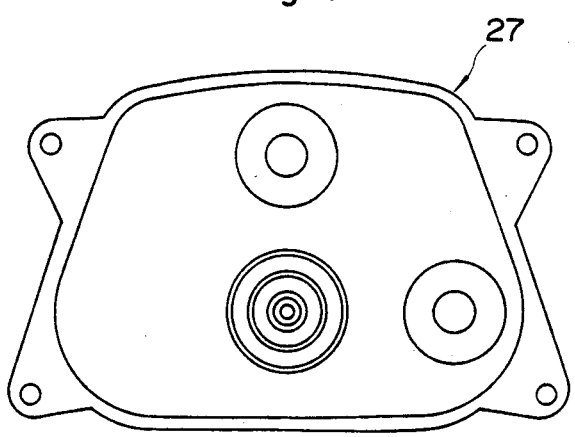
FIG. 7 is a front view of a driving-section case shown in FIG. 6.
Figure 18:
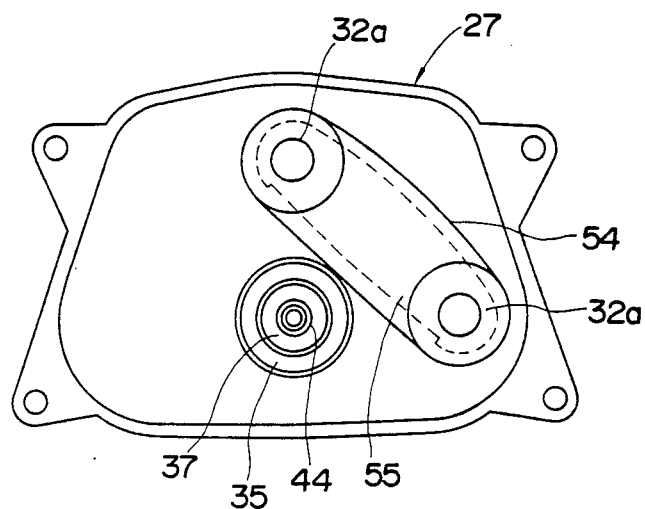
FIG. 18 is a front view of the driving-section case provided with a waterproof cover.
Figure 19:
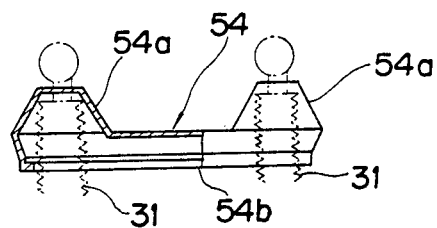
FIG. 19 is a cross sectional view of the waterproof cover shown in FIG. 18.
Figure 20:
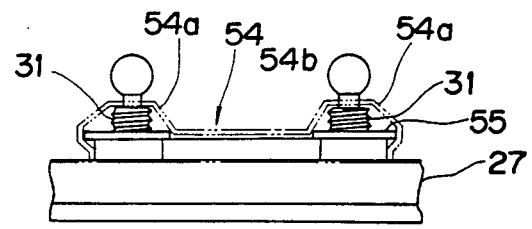
FIG. 20 is a side view of the driving-section case with the waterproof cover.

Referring to FIG. 18, a driving-section case which is the same as that shown in FIG. 7 is shown. At the mirror body side of the case 27 a waterproof cover 54 is mounted, the waterproof cover is composed of unbrella-like portions 54a and 54a and cover body portion 54b integrally connecting the unbrella-like portions 54a. As shown in FIG. 20 there are provided cover mounting members 55 surrounding the two threaded rods 31 and secured to the case 27, and the lower portion of the cover body portion 54b is fitted to the cover mounting members 55.

Thus a single waterproof cover 54 prevents two threaded rods 31 from water, and the cover 54 has a simple configuration and mounting of the cover 54 to the rods are very easy.

Figure 21:
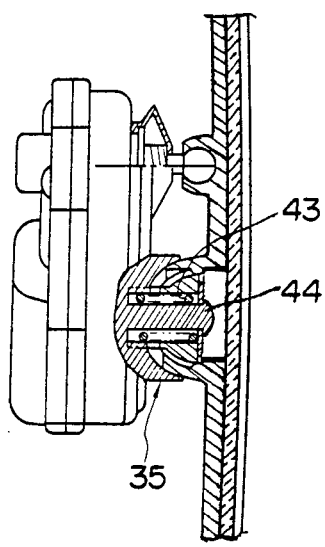
FIG. 21 is a partially exploded sectional view of a driving mechanism of another embodiment of the present invention.
Figure 22:
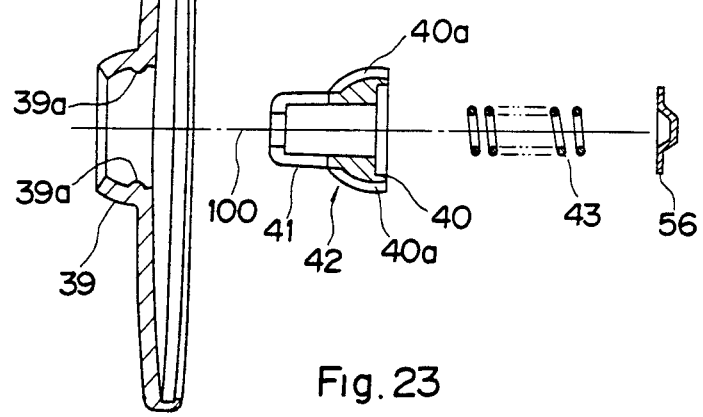
FIG. 22 is an enlarged exploded view of the driving mechanism shown in FIG. 21.
Figure 23:
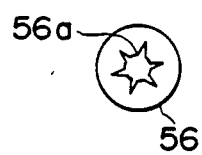
FIG. 23 is an enlarged front view of a washer shown in FIG. 22.

Referring now to FIGS. 21 and 22 there is shown another embodiment of the present invention being mainly different from the above-mentioned embodiment at the following two points.

One point of the two points is that there is provided no screw hole at the end portion of the column 44' mounted at the central bottom portion of the ball base 35 of the pivot connection, and a clip 56 having a plurality of tongue pieces 56a at inner portion thereof. The coil spring 43 inserted into the column 44' is held by the clip 56, namely by biting of the tongue pieces 56a against the free end portion of the column 44'. According to the arrangement thus constructed, operation steps in assembling the pivot connection can be effectively reduced.

The other point is that there are provided two small projections 39a at the inner surface of two boss portion 39 which are located in opposite positions with each other, with respect to the pivot axis 100, and further two slots 40a at the half-ball like portion 40 extending in the direction of the pivot axis 100. According to the arrangements thus constructed, the two projections 39a can be fitted into the two slots respectively thereby to surely prevent the rotation of the boss portion 39 mounted on the mirror body 29 around the pivot axis 100.

Thus the rotation of the mirror body 29 around the pivot axis 100 is surely avoided by connections between the elongated projections 38 provided at the ball base 35 integrally formed with the driving-section case 27 fixed on the mirror housing 26 and the slots 41b of the cylindrical portion of the pressure applying member 42, and further by connections between the small projections 39a of the boss portion 39 and the slots 40a of the pressure applying member 42. As a result, the mirror body 29 can be stably supported without producing a small vibration and a change of inclination.

As stated above, the electric remote control mirror apparatus of the present invention is mainly composed of a pivot connection and a mirror inclining means. The pivot connection is composed of a ball base having a concave surface integrally formed with the member fixed to the mirror housing as a fixed body, and a cylindrical hole provided at the central portion of the concave surface coaxially with the pivot axis, together with elongated projections formed along the inner wall of the cylindrical hole which extend in the direction of the pivot axis. A boss portion is integrally formed with the mirror body as a movable body, for fitting to the concave surface of the ball base. The pivot connection also includes a pressure applying member having a half-ball like portion which is fitted to the inner surface of the boss portion of the mirror body, and a cylindrical portion which is inserted into the cylindrical hole, and slots to be connected to the elongated projections. It also includes a coil spring received in the cylindrical portion of the pressure applying member for urging the pressure applying member against the ball base. The mirror inclining means is secondarily composed of a threaded rod having screw at the peripheral surface thereof and an elongated slot extending in the direction of the rod's axis for guiding the threaded rod along the rod's axis, and support means are provided together with a projection to be connected to the elongated slot for supporting the threaded rod and guiding the rod along the rod's axis.

According to the above construction of the electric remote control mirror apparatus, the rotation of the threaded rod around the pivot axis is avoided, the whole thickness of the mirror apparatus being reduced, the rotating resistance being easily and precisely adjustable, the adjusted condition of the rotating resistance being not changed in use, so that vibration and change of inclination of the mirror body will not occur.

What is claimed is:

1. An electric remote control mirror apparatus comprising
   a mirror,
   a mirror body fixed to said mirror,
   a mirror housing receiving said mirror body,
   support means fixed within said mirror housing for holding said mirror body in said mirror housing, said support means including a pivot connection for pivotably supporting said mirror body thereto,
   two ball bases connected to said mirror housing and located on respective lines perpendicular to each other and crossing at said pivot connection, a pair of threaded rods each of which has a ball member at the end thereof and a threaded peripheral surface thereof, a screw member drivingly connected to each of said threaded rods, transmission means for respectively transmitting driving force to each of said screw members, electric motor means for driving said screw members through said transmission means,
   said pivot connection including a ball base having a concave surface integrally formed with said support means, means defining a cylindrical hole extending inwardly away from the central portion of said concave surface coaxially with the pivot axis, at least one elongated projection formed so as to extend along the inner wall of said cylindrical hole in the direction of the pivot axis, means defining a column at the central bottom portion of said cylindrical hole means, said column means extending toward said concave surface coaxially with said pivot axis, said column means further including means defining an elongated threaded interior opening;
   a hollow convex shaped portion integrally formed with said mirror body for fitting within said concave surface of said ball base and having means defining an opening in the central portion of said hollow convex shaped portion;
   a pressure applying member having a convex shaped portion to be fitted to the inner surface of said hollow convex shaped portion of said mirror body, and a cylindrical portion to be inserted into said cylindrical hole means through said opening means in said hollow convex shaped portion, said cylindrical portion having means defining at least oen slot for engaging said at least one elongated projection for preventing rotation around the pivot axis, a coil spring disposed within said cylindrical portion about said column, one end thereof being in contact with a seat adjustably mounted at the top of said column and the other end thereof being positioned against the end wall of said cylindrical portion for urging said pressure applying member against said ball base; and
   wherein each of said threaded rods includes an elongated slot for guiding the movement of said threaded rod housing means for receiving said threaded rods therethrough and projection means provided on said housing means to be connected to said elongated slot for supporting said threaded rod and guiding it along the rod's axis thereby prohibiting rotation of said threaded rod around the rod's axis.

2. An electric remote control mirror apparatus according to claim 1, wherein either one of said hollow convex shaped portion and said convex shaped portion having at least one projection, and the other thereof having at least one slot to be connected to said projection, thereby preventing a rotation of said hollow convex shaped portion around the pivot axis.

3. An electric remote control mirror apparatus according to claim 1, further comprising a waterproof cover which can be fitted to a cover mounting members for protectively enveloping said threaded rods.

4. An electric remote control mirror apparatus according to claim 1, wherein said screw member has a cylindrical and central through hole adapted to fit the threaded rod, and hold a spring member for adapted to be movable in the surface perpendicular to the rod's axis pinching the valleys of the screw of said threaded rod.

5. An electric remote control mirror apparatus comprising
   a mirror having a backing member,
   mirror housing means for receiving said mirror,
   means for pivotally mounting said mirror within said mirror housing means to thereby define a pivoting axis, said pivotal mounting means including a housing member secured within said mirror housing means,
   a pivot connection comprised to a partial ball base having a concave surface integrally formed with and extending outwardly from said housing member, means defining a cylindrical hole extending inwardly away from the central portion of said concave surface coaxially with the pivot axis to a bottom portion, at least one elongated projection formed so as to extend along the inner wall of said cylindrical hole in the direction of the pivot axis, means defining a column at the central bottom portion of said cylindrical hole means, said column means extending outwardly away from said bottom portion toward said concave surface coaxially with said pivot axis, said column means further including means defining an elongated interior opening, said backing member including a hollow convex shaped partial spherical projection integrally formed therewith and dimensioned to fit within said concave surface and having means defining a centrally positioned opening therein, a pressure applying member having integrally formed upper and lower portions, said upper portion comprising a convex shaped partial spherical member dimensioned to fit within the interior of said hollow convex shaped portion of said backing member, said lower portion comprising a cylindrical member dimensioned to fit into said cylindrical hole means and through said opening means in said hollow convex shaped projection, said cylindrical portion having an annular end wall for fitting around said column means and means defining at least one slot for engaging said at least one elongated projection for preventing rotation of said mirror around the pivot axis, and a coil spring disposed within said cylindrical portion about said column, one end thereof being in contact with a seat adjustably mounted at the top of said column and the other end thereof being held against said annular end wall for urging said pressure applying member toward said ball base so that said hollow convex shaped projection is retained between said ball base and said pressure applying member.

6. An electric remote control mirror as in claim 5, wherein said mirror pivoting means includes two ball bases positioned, respectively, on lines perpendicular to each other and crossing at said pivot connection, a pair of control rods having a threaded portion and being operatively connected to said backing member, drive means operatively connected to the threaded portion of said control rods for moving said control rods to pivot said mirror, wherein said threaded portion includes an elongated slot extending therealong, said housing member for said pivoting means including means defining an opening through which said threaded portion can move axially, said housing member opening including projection means for engaging said elongated slot and guiding said control rod so that rotation of said threaded portion is prohibited.

7. An electric remote control mirror as in claim 5 wherein said seat is adjustably mounted by means of a screw threadedly engaged within said elongated interior opeining in said column means.

8. An electric remote control mirror as in claim 5, wherein rotation prevention means are provided between the upper portion of said pressure applying member and said backing member.

* * * * *